US010815611B2

(12) United States Patent
Carow et al.

(10) Patent No.: US 10,815,611 B2
(45) Date of Patent: Oct. 27, 2020

(54) METHOD FOR DRYING LAUNDRY IN A LAUNDRY TREATING APPLIANCE (71) Applicant: WHIRLPOOL CORPORATION, Benton Harbor, MI (US)

(72) Inventors: James P. Carow, Saint Joseph, MI (US); Moeed Mukhtar, Horseheads, NY (US); Sanjida Tamanna, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 139 days.

(21) Appl. No.: 16/172,224

(22) Filed: Oct. 26, 2018

(65) Prior Publication Data
US 2019/0062986 A1 Feb. 28, 2019

Related U.S. Application Data (63) Continuation of application No. 14/663,791, filed on Mar. 20, 2015, now Pat. No. 10,138,590.

(51) Int. Cl.
*F26B 19/00* (2006.01)
*D06F 58/30* (2020.01)
*D06F 58/38* (2020.01)
*D06F 103/08* (2020.01)
*D06F 105/28* (2020.01)

(52) U.S. Cl.
CPC .............. *D06F 58/30* (2020.02); *D06F 58/38* (2020.02); *D06F 2103/08* (2020.02); *D06F 2105/28* (2020.02)

(58) Field of Classification Search
CPC ........ D06F 58/26; D06F 58/263; D06F 58/30; D06F 58/38; D06F 58/40; D06F 2103/08; D06F 2103/52; D06F 2103/28; D06F 2105/28; D06F 58/36; D06F 58/32; D06F 58/34; D06F 58/48
USPC ......... 34/551, 549, 553, 474, 475, 476, 443, 34/507, 72
See application file for complete search history.

(56) References Cited

U.S. PATENT DOCUMENTS

| 3,100,144 | A | | 8/1963 | Berenbaum et al. |
| 3,363,326 | A | | 1/1968 | Weeks |
| 4,622,759 | A | | 11/1986 | Abe et al. |
| 4,827,627 | A | | 5/1989 | Cardoso |
| 5,161,314 | A | * | 11/1992 | Souza .................. D06F 58/30 34/493 |
| 6,199,300 | B1 | * | 3/2001 | Heater .................. D06F 58/30 34/446 |
| 7,594,343 | B2 | | 9/2009 | Woerdehoff et al. |
| 8,093,536 | B2 | | 1/2012 | Kim |

(Continued)

FOREIGN PATENT DOCUMENTS

EP     2610400 A1   7/2013

*Primary Examiner* — John P McCormack
(74) *Attorney, Agent, or Firm* — McGarry Bair PC (57) ABSTRACT

A method of drying laundry in a laundry treating appliance having a treating chamber in which the laundry is received for drying comprises moving the treating chamber to redistribute the laundry, supplying air to the treating chamber to define a supply air flow, exhausting the supplied air from the treating chamber to define an exhaust air flow, heating the air supplied to the treating chamber by actuating a heater at full output to define a first heating phase and then cycling the heater ON/OFF to define a second heating phase.

18 Claims, 5 Drawing Sheets

(56) References Cited

U.S. PATENT DOCUMENTS

| | | |
|---|---|---|
| 2012/0017463 A1 | 1/2012 | Prajescu et al. |
| 2012/0284930 A1 | 11/2012 | Robertson et al. |
| 2012/0317832 A1* | 12/2012 | Lakkineni ............... D06F 58/20 34/477 |
| 2013/0086812 A1* | 4/2013 | Bellinger ................ D06F 58/30 34/495 |
| 2013/0118024 A1* | 5/2013 | Jablonski ................ F26B 25/22 34/282 |
| 2013/0167398 A1* | 7/2013 | Lee ......................... F26B 23/00 34/282 |

\* cited by examiner

METHOD FOR DRYING LAUNDRY IN A LAUNDRY TREATING APPLIANCE

CROSS-REFERENCE TO RELATED APPLICATIONS

This application is a continuation of U.S. patent application Ser. No. 14/663,791 filed on Mar. 20, 2015, now U.S. Pat. No. 10,138,590, issued Nov. 27, 2018, which is hereby incorporated by reference in its entirety.

BACKGROUND

Laundry treating appliances, such as clothes dryers and combination washer/dryers may have a configuration based on a rotating drum that defines a treating chamber in which laundry items are placed for drying according to a cycle of operation. The laundry treating appliance may have a controller operably connected with the various components of the laundry treating appliance, including a heater, to execute the cycle of operation. During a cycle of operation, the laundry treating appliance may supply air heated by the heater into a drum. Historically, the heater is turned on/off based on the temperature of the air exiting the treating chamber to control the supply of heated air to the treating chamber. While such a heater control is effective at ultimately drying the laundry, it does so by either oversupplying heat, especially when short dry times are desired, or having undesirably long dry times, when low heat is desired.

BRIEF DESCRIPTION

Aspects of the present disclosure relate to a laundry treating appliance and methods of drying laundry including moving the treating chamber to redistribute the laundry, supplying air to the treating chamber to define a supply air flow, exhausting the supplied air from the treating chamber to define an exhaust air flow, and heating the air supplied to the treating chamber by actuating a heater at full output until a maximum evaporation rate is met to define a first phase wherein the maximum evaporation rate is met when a maximum evaporated threshold value related to a temperature or rate of change of the exhaust air flow is satisfied and then during a second phase cycling the heater on and off.

DETAILED DESCRIPTION

Figure 1:
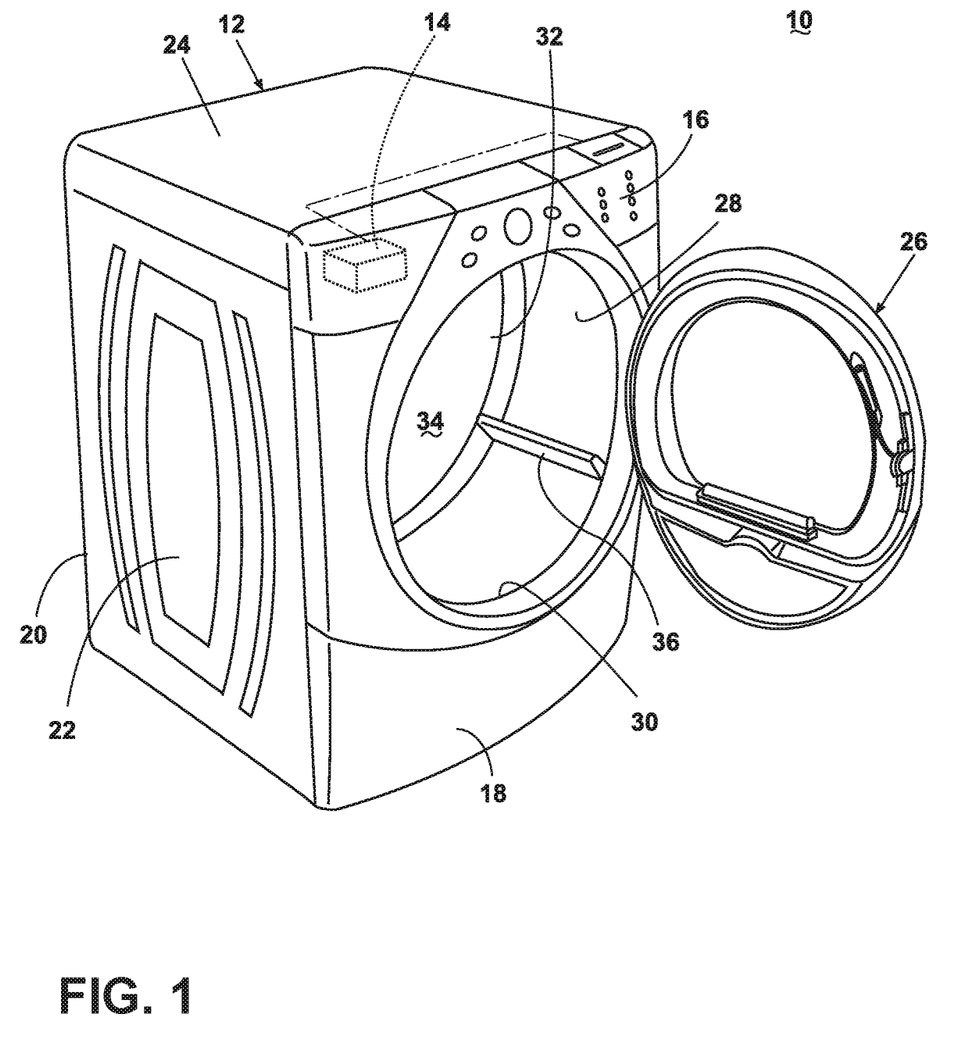
FIG. 1 is a front perspective view of a clothes dryer, wherein the clothes dryer may be controlled based on a method according to aspects of the present disclosure.

FIG. 1 illustrates one embodiment of a laundry treating appliance in the form of a clothes dryer 10 according to aspects of the present disclosure. While the laundry treating appliance is illustrated as a front-loading dryer, the laundry treating appliance according to aspects of the present disclosure may be another appliance which performs a cycle of operation on laundry, non-limiting examples of which include a top-loading dryer, a combination washing machine and dryer; a tumbling or stationary refreshing/revitalizing machine; an extractor; a non-aqueous washing apparatus; and a revitalizing machine. The clothes dryer 10 described herein shares many features of a traditional automatic clothes dryer, which will not be described in detail except as necessary.

As illustrated in FIG. 1, the clothes dryer 10 may include a cabinet 12 in which is provided a controller 14 that may receive input from a user through a user interface 16 for selecting a cycle of operation and controlling the operation of the clothes dryer 10 to implement the selected cycle of operation. The clothes dryer 10 will offer the user a number of pre-programmed cycles of operation to choose from, and each pre-programmed cycle of operation may have any number of adjustable cycle modifiers. Examples of such modifiers include, but are not limited to chemistry dispensing, load size, a load color, and/or a load type.

The cabinet 12 may be defined by a chassis or frame supporting a front wall 18, a rear wall 20, and a pair of side walls 22 supporting a top wall 24. A door 26 may be hingedly mounted to the front wall 18 and may be selectively moveable between opened and closed positions to close an opening in the front wall 18, which provides access to the interior of the cabinet 12.

A rotatable drum 28 may be disposed within the interior of the cabinet 12 between opposing front and rear bulkheads 30 and 32, which collectively define a treating chamber 34 having an open face that may be selectively closed by the door 26. The drum 28 may include at least one baffle or lifter 36. In most clothes dryers, there are multiple lifters 36. The lifters 36 may be located along the inner surface of the drum 28 defining an interior circumference of the drum 28. The lifters 36 may facilitate movement of laundry within the drum 28 as the drum 28 rotates.

Figure 2:
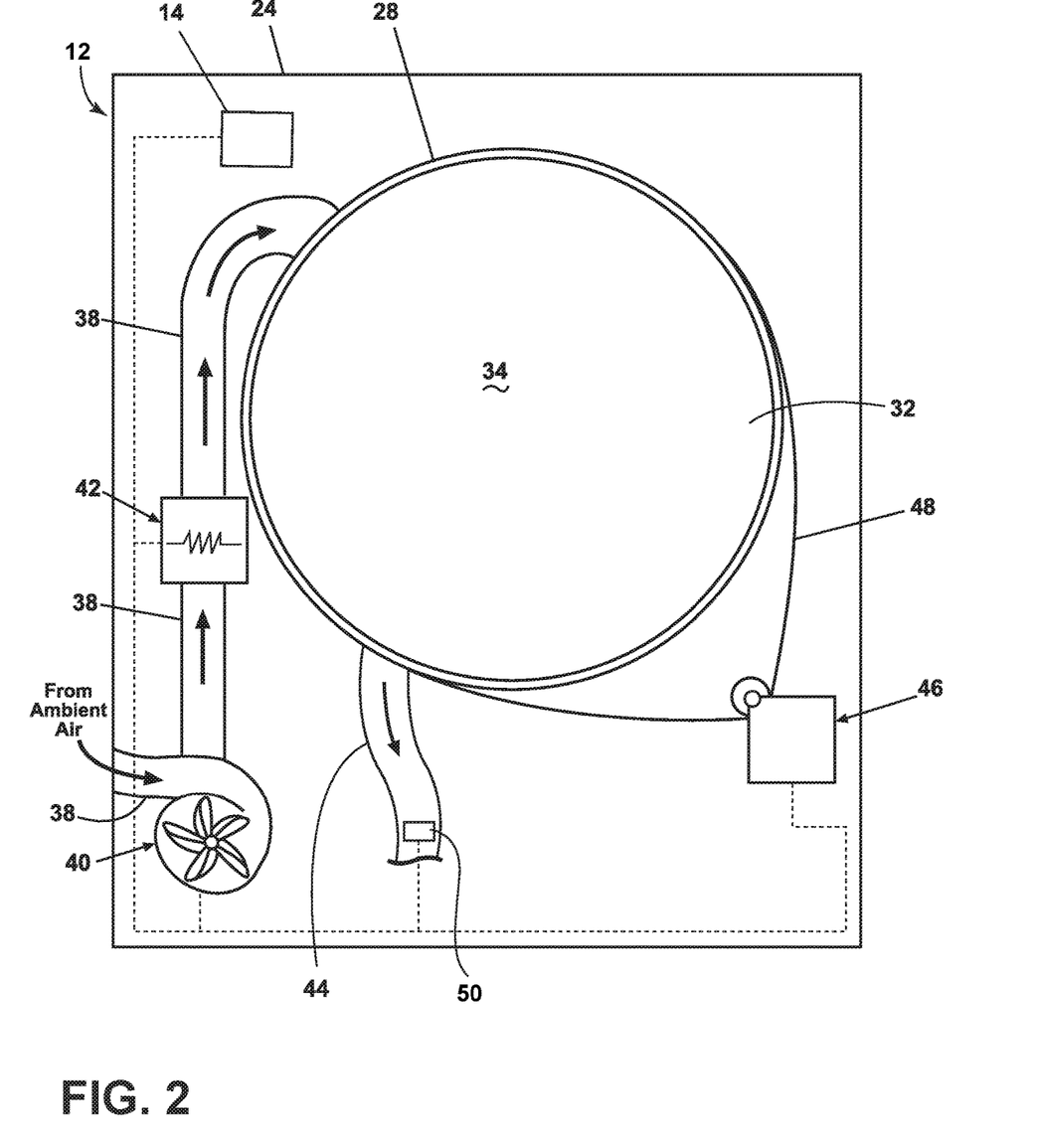
FIG. 2 is a front schematic view of the clothes dryer of FIG. 1.

Referring to FIG. 2, an air flow system for the clothes dryer 10 is schematically illustrated and supplies air to the treating chamber 34 and then exhausts air from the treating chamber 34. The air flow system may have an air supply portion that may be formed in part by a supply air conduit 38, which has one end open to the ambient air and another end fluidly coupled to the treating chamber 34. Specifically, the supply air conduit 38 may couple with the treating chamber 34 through an inlet grill (not shown) formed in the rear bulkhead 32. A fan 40 and a heater 42 may lie within the supply air conduit 38 and may be operably coupled to and controlled by the controller 14. If the heater 42 is cycled on, the supplied air will be heated prior to entering the drum 28. The air supply system may further include an air exhaust portion that may be formed in part by an exhaust air conduit 44. Operation of the fan 40 draws air into the treating chamber 34 by the supply air conduit 38 and exhausts air from the treating chamber 34 through the exhaust air conduit 44. The exhaust air conduit 44 may be fluidly coupled with a household exhaust duct (not shown) for exhausting the air from the treating chamber 34 to the outside environment. However, other air flow systems are possible as well as other arrangements of the fan 40 and heater 42. For example, the fan 40 may be located in the exhaust air conduit 44 instead of the supply air conduit 38.

The clothes dryer 10 may be provided with a temperature sensor 50 to determine the temperature of the air in the exhaust air conduit 44. One example of a temperature sensor 50 is a thermocouple. The temperature sensor 50 may be operably coupled to the controller 14 such that the controller 14 receives output from the temperature sensor 50. The temperature sensor 50 may be mounted at any location in or near the exhaust air conduit 44 of the clothes dryer 10 such that the temperature sensor 50 may be able to accurately sense the temperature of the exhaust air flow. For example, the temperature sensor 50 may be coupled the cabinet 12 in the area if the exhaust air conduit 44.

As is typical in a clothes dryer, the drum 28 may be rotated by a suitable drive mechanism, which is illustrated as a motor 46 and a coupled belt 48. The motor 46 may be operably coupled to the controller 14 to control the rotation of the drum 28 to complete a cycle of operation. Other drive mechanisms, such as direct drive, may also be used.

The clothes dryer 10 may also have a dispensing system (not shown) for dispensing treating chemistries into the treating chamber 34. The dispensing system may introduce treating chemistry into the drum 28 in any suitable manner, such as by spraying, dripping, or providing a steady flow of the treating chemistry. The treating chemistry may be in a form of gas, liquid, solid or any combination thereof and may have any chemical composition enabling refreshment, disinfection, whitening, brightening, increased softness, reduced odor, reduced wrinkling, stain repellency or any other desired treatment of the laundry. Water is one example of a suitable treating chemistry. Other non-limiting examples of suitable treating chemistries are chromophore chemistry, softening chemistry, and stain-repellency chemistry. In all cases, the treating chemistries may be composed of a single chemical, a mixture of chemicals, or a solution of water and one or more chemicals.

Figure 3:
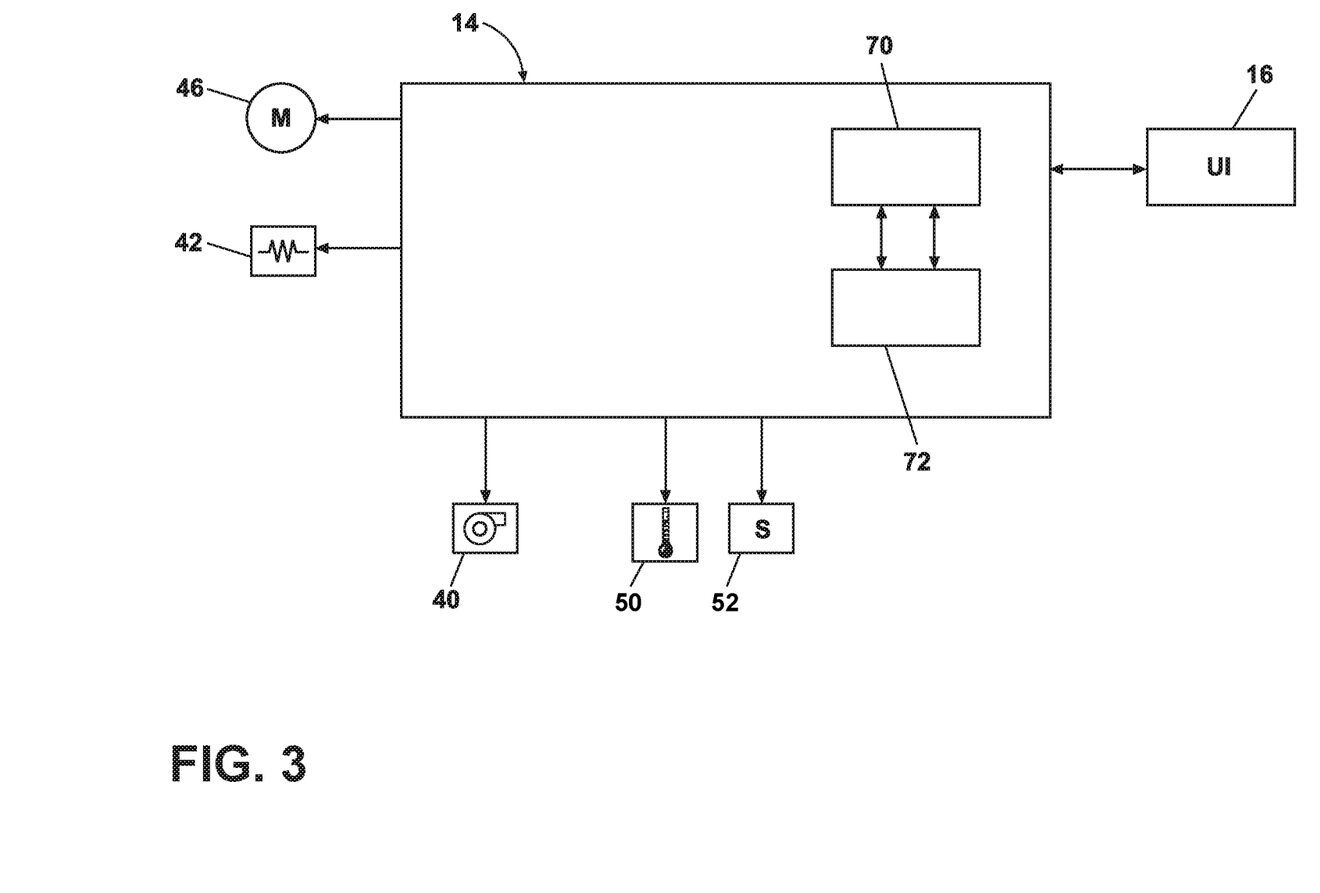
FIG. 3 is a schematic representation of a controller for controlling the operation of one or more components of the clothes dryer of FIG. 1.

As illustrated in FIG. 3, the controller 14 may be provided with a memory 70 and a central processing unit (CPU) 72. The memory 70 may be used for storing the control software that may be executed by the CPU 72 in completing a cycle of operation using the clothes dryer 10 and any additional software. The memory 70 may also be used to store information, such as a database or table, and to store data received from the one or more components of the clothes dryer 10 that may be communicably coupled with the controller 14.

The controller 14 may be operably coupled with one or more components of the clothes dryer 10 for communicating with and/or controlling the operation of the component to complete a cycle of operation. For example, the controller 14 may be coupled with the fan 40 and the heater 42 for controlling the temperature and flow rate of the air flow through the treatment chamber 34; the motor 46 for controlling the direction and speed of rotation of the drum 28; the temperature sensor 50 for receiving information about the temperature of the exhaust air flow; and the user interface 16 for receiving user selected inputs and communicating information to the user. The controller 14 may also receive input from various additional sensors 52, which are known in the art and not shown for simplicity. Non-limiting examples of additional sensors 52 that may be communicably coupled with the controller 14 include: a treating chamber temperature sensor, a supply air flow temperature sensor, a moisture sensor, an air flow rate sensor, a weight sensor, and a motor torque sensor.

Generally, in normal operation of the clothes dryer 10, a user first selects a cycle of operation via the user interface 16. The user may also select one or more cycle modifiers. In accordance with the user-selected cycle and cycle modifiers, the controller 14 may control the operation of the rotatable drum 28, the fan 40 and the heater 42, to implement the cycle of operation to dry the laundry. When instructed by the controller, the motor 46 rotates the drum 28 via the belt 48. The fan 40 draws air through the supply air conduit 38 and into the treating chamber 34, as illustrated by the flow vectors. The air may be heated by the heater 42. Air may be vented through the exhaust air conduit 44 to remove moisture from the treating chamber 34. During the cycle, treating chemistry may be dispensed into the treating chamber 34. Also during the cycle, output generated by the temperature sensor 50 and any additional sensors 52 may be utilized to generate digital data corresponding to sensed operational conditions inside the treating chamber 34. The output may be sent to the controller 14 for use in calculating operational conditions inside the treating chamber 34, or the output may be indicative of the operational condition. Once the output is received, the controller 14 processes the output for storage in the memory 70. The controller 14 may convert the output during processing such that it may be properly stored in the memory 70 as digital data. The stored digital data may be processed in a buffer memory, and used, along with preselected coefficients, in algorithms to electronically calculate various operational conditions, such as a degree of wetness or moisture content of the laundry. The controller 14 may use both the cycle modifiers specified by the user and the additional information obtained by the sensors 50, 52 to carry out the desired cycle of operation.

The previously described clothes dryer 10 provides the structure necessary for the implementation of aspects of the present disclosure. Several embodiments of the method will now be described in terms of the operation of the clothes dryer 10. The embodiments of the method function to ensure proper drying of a load of laundry.

Figure 4:
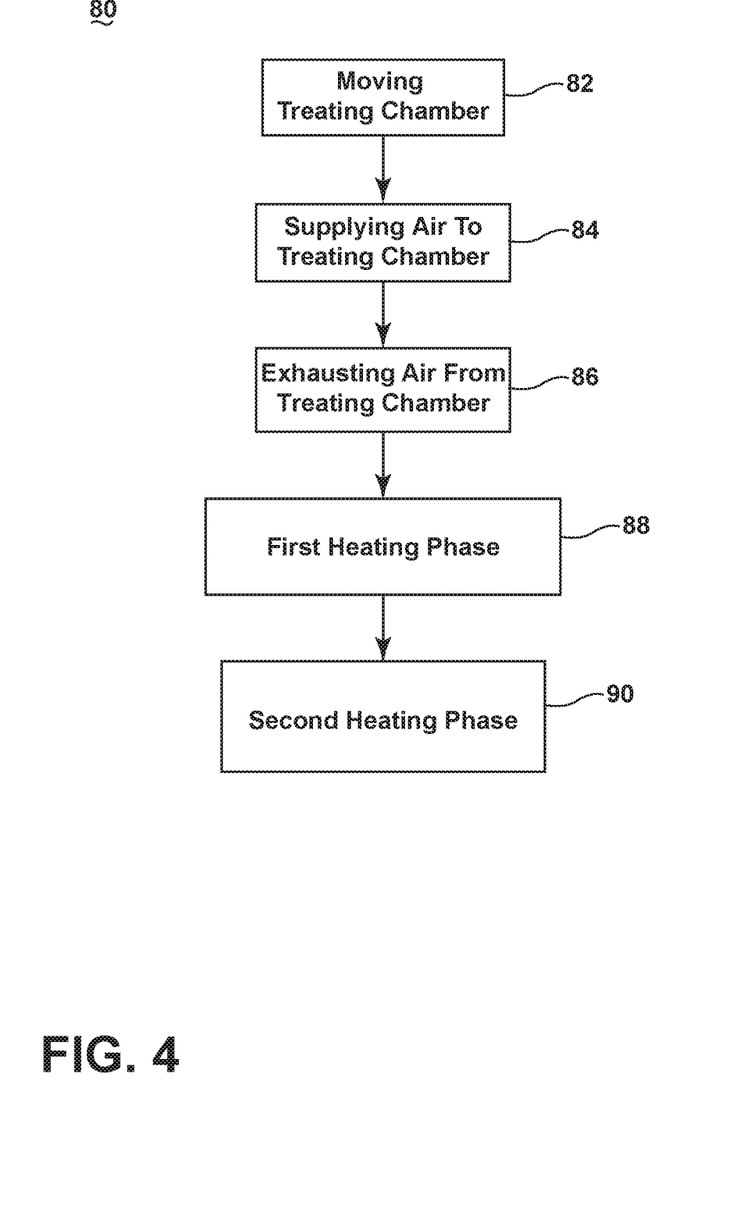
FIG. 4 is a flow-chart depicting a method according to aspects of the present disclosure.

Referring to FIG. 4, a flow-chart depicting a method 80 for drying laundry according to one aspect of the present disclosure is shown, and includes a more specific cycle of operation based on the normal operation described above. The method 80 may be carried out by the controller 14 using information inputted by the user via the user interface 16 and from the sensors 50, 52. The sequence of steps depicted is for illustrative purposes only and is not meant to limit the method 80 in any way as it is understood that the steps may proceed in a different logical order, additional or intervening steps may be included, or described steps may be divided into multiple steps, without detracting from aspects of the present disclosure.

In general, the method 80 is based on the evaporation rate of the moisture from the laundry in the treating chamber. The method 80 controls the ON/OFF of the heater to provide enough heat such that the moisture in the laundry load reaches a maximum evaporation rate and then maintains that maximum evaporation rate. The method 80 is accomplished without supplying more heat than necessary to reach the maximum evaporation rate. In this way, the method 80 provides the fastest possible drying time with the least amount of heat. The method 80 provides an initial in-rush of heat to achieve the maximum evaporation rate and then cycles the heater ON/OFF to maintain the maximum evaporation rate in order to dry the laundry in the least amount of time and with the least amount of energy consumption from the heater.

Looking at the details of the method 80, the method 80 comprises moving the treating chamber 82 to redistribute the laundry, supplying air to the treating chamber 84 to define a supply air flow, exhausting the supplied air from the treating chamber 86 to define an exhaust air flow, heating the air supplied to the treating chamber by actuating a heater at full output to define a first heating phase 88 and then cycling the heater ON/OFF to define a second heating phase 90. The first heating phase 88 may include actuating a heater at full output until a maximum evaporation rate is met and the second heating phase 90 may include cycling the heater ON/OFF to maintain the maximum evaporation rate. It will be understood that the heater may have multiple output levels and that actuating the heater at full output comprises actuating the heater at one of the output levels.

Most heaters, be it electric or gas powered, operate at a full ON power or a full OFF power and do not have variable power to generate variable heat outputs. A variable power heater would allow the heat output level to be continuously changed in order to maintain an ideal maximum evaporation rate without cycling the heater ON/OFF. However, utilizing a heater which must be cycled ON/OFF at full power introduces component limitations such as heater cycle times and moisture generated by a gas heater flame ignition, which prevent a perfect maintaining of an ideal maximum evaporation rate. Therefore, it will be understood that maintaining the maximum evaporation rate as used in this description will be subject to these limitations and may not be a perfect maintaining of the maximum evaporation rate, but refers to a maintaining of the maximum evaporation within the practical limitations of the particular laundry treating appliance.

The method 80 may also include receiving an input indicative of at least one characteristic of the laundry in the treating chamber wherein the first heating phase 88 includes actuating a heater at full output for a predetermined time, which is experimentally determined to provide a maximum evaporation rate for laundry having the at least one characteristic. The input may be supplied by a user or sensors and the at least one characteristic may include one or both of the size or type of the load. The size may refer to the load size and be quantified by user settings such as small, medium or large, or may be determined using sensors such as a weight sensor. The load type may include specific fabric types such as cottons, linen, denim etc. or may include general fabric types such as delicate, permanent press, etc.

Ideally, the method 80 would be able to accomplish the balance between maintaining the maximum evaporation rate and minimizing the supplied heat. With contemporary controllers, it would be possible to get close to the ideal if a suitable controller, heater, and humidity sensor were used. Such systems are less desirable because of their relative expense. Another approach, is to experimentally determine, for a given laundry load, the amount of heat needed to bring the load to the maximum evaporation rate and maintain it at the maximum evaporation rate until the desired amount of dryness is reached. Whether a sensor based solution is used or an experimental based system is used, neither system would perfectly maintain the maximum evaporation rate. Instead, each approach would, based on the controller and approach, maintain the evaporation rate as close as practical to the maximum evaporation rate for that given controller and approach.

Figure 5A:
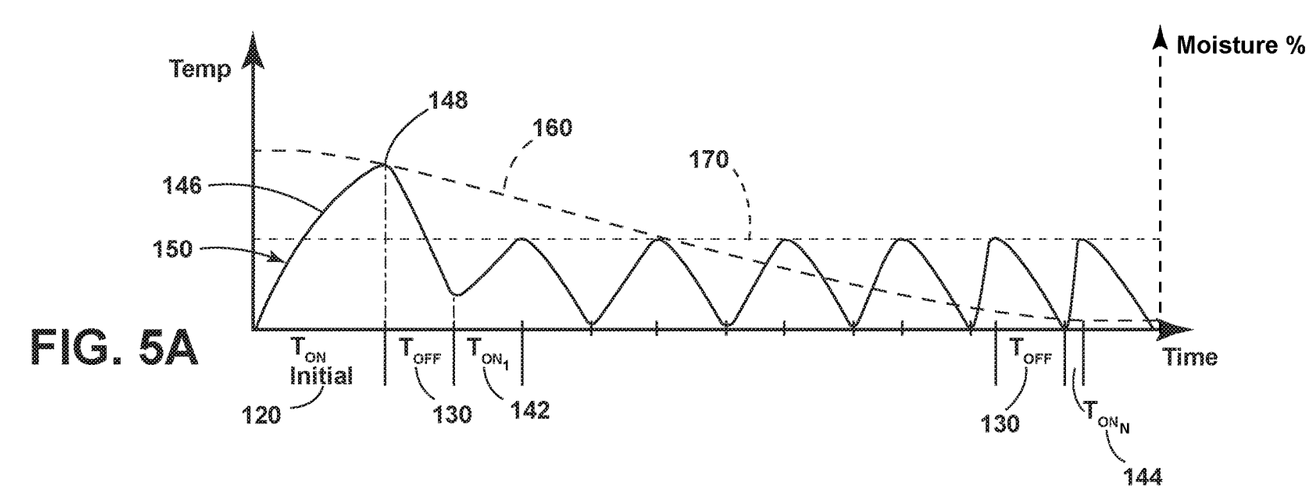
FIG. 5A is a graph illustrating the exhaust air flow temperature profile and moisture percentage profile during a cycle of operation.
Figure 5B:
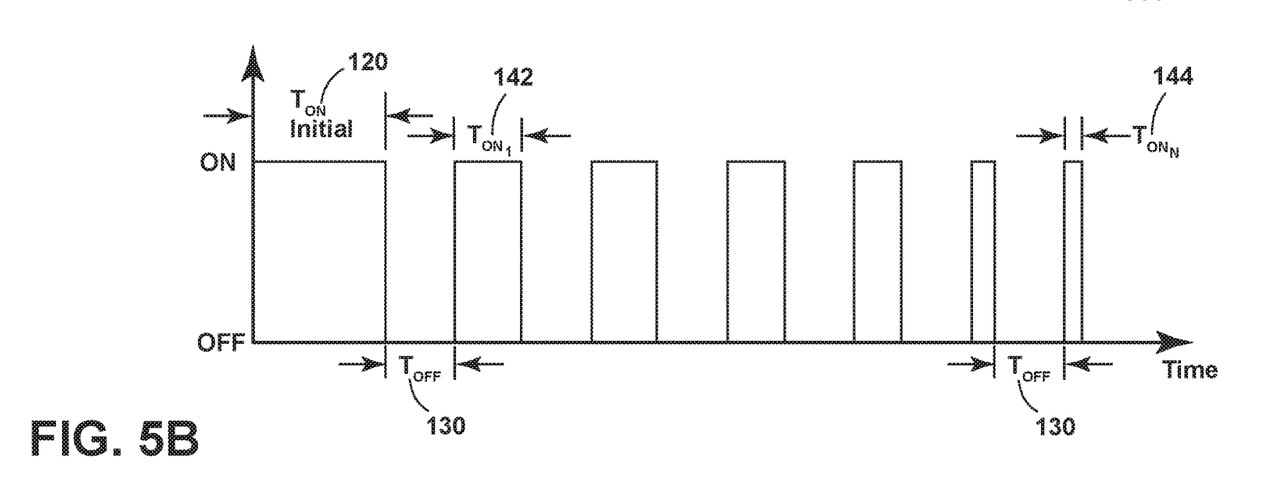
FIG. 5B is a graph illustrating the heater ON/OFF time corresponding to the exhaust air flow temperature profile of FIG. 5A.

FIG. 5A shows a graph illustrating the outlet air temperature profile 150 and moisture percentage profile 160 during a cycle of operation and FIG. 5B shows a graph illustrating the heater ON/OFF time during a cycle of operation, according to an aspects of the present disclosure. The first heating phase corresponds to the initial ON time 120 of the heater. During the initial ON time 120, the heater is actuated ON at full output until a maximum evaporation rate is met. The initial ON time 120 acts to heat the supply air, the laundry within the treating chamber and the laundry treating appliance in order to meet the maximum evaporation rate and the time duration will be a function of the mass of the machine, mass of the load and the laundry type and will vary from appliance to appliance. It is for this reason that the initial ON time 120 will be experimentally determined for each combination of appliance and load type.

During the initial ON time 120, the heater actuated at full output heats the supply air, the laundry within the treating chamber and the laundry treating appliance until the moisture percentage in the laundry begins to decrease at a constant rate due to the maximum evaporation rate being met. The point at which the maximum evaporation rate is met may be defined as the maximum evaporation threshold value 148 such that meeting the maximum evaporation rate includes satisfying the maximum evaporation threshold value 148. The maximum evaporation threshold value 148 may also be defined as a point at which the initial profile curve 146 of the exhaust air flow temperature levels off or begins to level off, a point on the initial profile curve 146 when a time rate of change of the exhaust air flow temperature drops below a predetermined rate or a point when the initial profile curve 146 reaches a predetermined temperature. The maximum evaporation threshold value 148 indicates that the heat energy supplied by the heater is being used to evaporate the moisture within the laundry load and that the maximum evaporation rate has been met.

The initial ON time 120 of the heater may be a predetermined time which is experimentally determined to provide the maximum evaporation rate for a given laundry load and the full output of the heater. That is, upon passing the predetermined time, the maximum evaporation threshold value 148 is satisfied. The predetermined time may also be experimentally determined to provide the maximum evaporation rate for a given laundry load having at least one characteristic received by the laundry treating appliance through an input indicative of the at least one characteristic. In this way, laundry loads having different characteristics may have a different predetermined time for the initial ON time 120 in order to satisfy the maximum evaporation threshold value 148.

Once the maximum evaporation rate has been met during the initial ON time 120, the heater is cycled OFF for a predetermined OFF time 130, starting the second heating phase. The predetermined OFF time 130 that the heater is cycled OFF may be experimentally determined to maintain the maximum evaporation rate for a given laundry load. The predetermined OFF time 130 acts to reduce energy of the appliance by turning OFF the heater while maintain the maximum evaporation rate and the time duration will be a function of the mass of the machine, mass of the load and the laundry type and will vary from appliance to appliance. It is for this reason that the predetermined OFF time 130 will be experimentally determined for each combination of appliance and load type.

After the passing of a predetermined OFF time 130 from the heater being cycled OFF, the heater is then cycled ON until a predetermined trip temperature 170 of the exhaust air flow has been met. The predetermined trip temperature 170 acts to allow the heater to supply enough heat to maintain the maximum evaporation rate and the predetermined trip temperature 170 will be a function of the mass of the machine, mass of the load and the laundry type and will vary from appliance to appliance. It is for this reason that the predetermined OFF time 130 will be experimentally determined for each combination of appliance and load type.

Cycling the heater OFF for a predetermined OFF time 130 and ON until a predetermined trip temperature 170 is met avoids issues related to ambient conditions. For example, in a case where the heater is cycled OFF until a predetermined low temperature of the exhaust air flow is reached and the ambient temperature is above the predetermined low temperature, the heater would never cycle ON. In another example, in the case where the heater is cycled ON for a predetermined time, the ambient temperature may be low enough that the exhaust air flow does not reach a desired temperature and the maximum evaporation rate is not met. In contrast, cycling the heater OFF for a predetermined OFF time 130 and ON until a predetermined trip temperature 170 is met avoids these issues.

During the second heating phase, the cycling of the heater ON/OFF is continued until the moisture percentage in the laundry load falls below a predetermined moisture percentage level, indicating a dry laundry load. As the moisture percentage continues to decrease, less heat energy is needed to maintain the maximum evaporation rate which corresponds to the exhaust air flow temperature reaching the predetermined trip temperature 170 in less time from the end of the previous OFF cycle. The predetermined moisture percentage level may be determined by the time the heater is cycled ON falling below a predetermined time threshold, defining a final cycle ON time 144. As illustrated, the time of an initial cycle ON time 142 of the heater in the second heating phase is less than the time of the final cycle ON time 144. Once the final cycle ON time 144 falls below the predetermined time threshold, the second heating phase may end and the heater may be cycled OFF. The predetermined time threshold may be experimentally determined to achieve a moisture percentage for a given laundry load below the predetermined moisture percentage level.

The aspects of the present disclosure provide for a plurality of benefits including that the providing a method of drying laundry using a first heating phase to meet a maximum evaporation rate and a second heating phase the maintain the maximum evaporation rate allows the laundry treating appliance to dry the laundry load with a minimum amount of energy and a minimum amount of sensors. By using an initial predetermined ON time for the heater, the laundry and appliance are able to be quickly brought up to a temperature that achieves the maximum evaporation rate of moisture in the laundry. Then by cycling the heater ON/OFF with predetermined times OFF and predetermined trip temperatures ON, the maximum evaporation rate may be maintain without wasting energy and while avoiding issues related to ambient conditions. Furthermore, the method of drying laundry is achieved using only an exhaust air temperature sensor as an input, providing a laundry treating appliance capable of carrying out the method with less manufacturing cost.

While aspects of the present disclosure have been specifically described in connection with certain specific embodiments thereof, it is to be understood that this is by way of illustration and not of limitation, and the scope of the appended claims should be construed as broadly as the prior art will permit. It should also be noted that all elements of all of the claims may be combined with each other in any possible combination, even if the combinations have not been expressly claimed.

What is claimed is:

1. A method of drying laundry in a laundry treating appliance having a treating chamber in which the laundry is received for drying, the method comprising:
   moving the treating chamber to redistribute the laundry;
   supplying air to the treating chamber to define supplied air;
   exhausting the supplied air from the treating chamber to define an exhaust air flow; and
   heating the air supplied to the treating chamber by actuating a heater at full output until a maximum evaporation rate is met to define a first phase, wherein the maximum evaporation rate is met when a maximum evaporated threshold value related to a temperature of the exhaust air flow is satisfied or a maximum evaporated threshold value related to a rate of change of a temperature of the exhaust air flow is satisfied, and then during a second phase cycling the heater on and off, wherein the cycling the heater on and off comprises the heater being cycled on until a predetermined trip temperature of the exhaust air flow is satisfied and the being cycled off, the second phase continuing until a predetermined moisture percentage level is satisfied; wherein the predetermined trip temperature is below a maximum temperature reached during the first phase.

2. The method of claim 1 wherein the maximum evaporation threshold value is satisfied when a temperature of the exhaust air flow levels off.

3. The method of claim 2 wherein the temperature of the exhaust air flow levels off when a time rate of change of the exhaust air flow drops below a predetermined rate.

4. The method of claim 1 wherein the maximum evaporation threshold value is satisfied upon a passing of a predetermined time experimentally determined to provide the maximum evaporation rate for a given load of the laundry and the full output of the heater.

5. The method of claim 1 wherein the second phase begins after a passing of a predetermined time.

6. The method of claim 1, further comprising the heater being turned off between the first and second phases.

7. The method of claim 6 wherein the heater is turned off between the first and second phases for a predetermined time.

8. The method of claim 1 wherein the actuating the heater at full output comprises actuating a heater having multiple output levels at one of the output levels.

9. The method of claim 1 wherein the heater being cycled off is based on a predetermined time.

10. The method of claim 1 wherein the predetermined moisture percentage level is satisfied when a time of the heater being cycled on during the second phase is below a predetermined time threshold.

11. A method of drying laundry in a laundry treating appliance having a treating chamber in which the laundry is received for drying, the method comprising:
   moving the treating chamber to redistribute the laundry;
   supplying air to the treating chamber to define a supplied air;
   exhausting the supplied air from the treating chamber to define an exhaust air flow;
   receiving an input indicative of at least one characteristic of the laundry in the treating chamber; and
   heating the air supplied to the treating chamber by actuating a heater at full output for a predetermined time, which is experimentally determined to provide a maximum evaporation rate for laundry having the at least one characteristic to define a first phase, and then during a second phase cycling the heater on and off, wherein the cycling the heater on and cycling the heater off comprises the heater being cycled on until a predetermined trip temperature of the exhaust air flow is satisfied; wherein the predetermined trip temperature is below a maximum temperature reached during the first phase.

12. The method of claim 11 wherein the second phase continues until a predetermined moisture percentage level indicative of a dry load is satisfied.

13. The method of claim 12 wherein the predetermined moisture percentage level is satisfied when a time of the heater being cycled on is below a predetermined time threshold.

14. The method of claim 11, further comprising cycling the heater off between the first and second phases.

15. The method of claim 11 wherein the heater being cycled off is based on a predetermined time.

16. The method of claim 11 wherein the at least one characteristic comprises at least one of size or type.

17. The method of claim 11 wherein the second phase begins after a passing of a predetermined time.

18. A laundry treating appliance for drying laundry according to a cycle of operation, comprising:
 a rotatable drum at least partially defining a treating chamber;
 a supply air conduit fluidly coupled to the treating chamber;
 an exhaust air conduit fluidly coupled to the treating chamber;
 a fan fluidly coupled to the supply air conduit, treating chamber, and exhaust air conduit to pass air from the supply air conduit, into the treating chamber, where it is exhausted through the exhaust air conduit;
 a heater thermally coupled to the supply air conduit to heat the air in the supply air conduit; and
 a controller operably coupled to the heater and the fan and configured to supply air to the treating chamber and heat the supplied air by actuating the heater at full output until a maximum evaporation rate is met to define a first phase wherein the maximum evaporation rate is met when a maximum evaporated threshold value is satisfied and then during a second phase cycling the heater on and off, wherein the cycling the heater on and off comprises the heater being cycled on until a predetermined trip temperature of the exhaust air flow is satisfied and wherein the cycling the heater comprises turning the heater off for a predetermined time based on at least one of: mass of the laundry treating appliance, mass of the laundry, or laundry type, the second phase continuing until a predetermined moisture percentage level is satisfied when a time of the heater being cycled on during the second phase is below a predetermined time threshold.

* * * * *